United States Patent
Zhu et al.

(10) Patent No.: US 6,723,825 B2
(45) Date of Patent: Apr. 20, 2004

(54) STABLE LIQUID MELAMINE UREA FORMALDEHYDE RESINS, HARDENERS, ADHESIVE COMPOSITIONS, AND METHODS FOR MAKING SAME

(75) Inventors: Huide Dennis Zhu, Ridgefield, CT (US); William Jacobs, III, Bethel, CT (US); Robert G. Lees, Stamford, CT (US); Luis Mendonca, Cheshire, CT (US); Roger C. Rasch, Bethel, CT (US)

(73) Assignee: Cytec Technology Corp., Wilmington, DE (US)

( * ) Notice: Subject to any disclaimer, the term of this patent is extended or adjusted under 35 U.S.C. 154(b) by 5 days.

(21) Appl. No.: 10/373,528

(22) Filed: Feb. 25, 2003

(65) Prior Publication Data

US 2003/0153721 A1 Aug. 14, 2003

Related U.S. Application Data

(62) Division of application No. 09/815,357, filed on Mar. 23, 2001, now Pat. No. 6,548,625.

(51) Int. Cl.[7] .................. C08G 12/32; C08G 12/36; C08G 12/10
(52) U.S. Cl. .................. 528/254; 528/256; 528/486; 524/789; 524/858; 525/480
(58) Field of Search .................. 528/254, 256, 528/486; 524/789, 858; 525/480

(56) References Cited

U.S. PATENT DOCUMENTS

| | | | |
|---|---|---|---|
| 4,536,245 A | 8/1985 | Shiau et al. | 156/307.3 |
| 4,603,191 A | 7/1986 | Kong | 528/259 |
| 4,997,905 A | 3/1991 | Druet et al. | 528/230 |
| 5,008,365 A | 4/1991 | Druet et al. | 528/230 |
| 5,162,462 A | 11/1992 | Barthomieux et al. | 525/549 |
| 5,681,917 A | 10/1997 | Breyer et al. | 528/256 |
| 5,684,118 A | 11/1997 | Breyer et al. | 528/256 |

FOREIGN PATENT DOCUMENTS

| | | |
|---|---|---|
| EP | 0501174 A1 | 9/1992 |
| WO | WO 95/20000 | 7/1995 |
| WO | WO 97/09360 | 3/1997 |
| WO | WO 99/48991 | 9/1999 |

OTHER PUBLICATIONS

Chung–Yun Hse et al., "Melamine modified urea–formaldehyde resin for bonding flakeboards," Forest Products Res. Soc., pp. 155–159 (1990).

*Primary Examiner*—Duc Truong
(74) *Attorney, Agent, or Firm*—James A. Jubinsky; Fran Wasserman; Claire M. Schultz

(57) ABSTRACT

The invention relates to a process for preparing a liquid melamine urea formaldehyde resin that has long term stability. The invention also relates to a liquid MUF resin with a high formaldehyde and melamine content. The invention further relates to a liquid suspension hardener including a catalyst, a thickener, a filler, and water. The invention also relates to a adhesive composition for use in wood bonding that is made by adding a hardener to the resin.

15 Claims, No Drawings

STABLE LIQUID MELAMINE UREA FORMALDEHYDE RESINS, HARDENERS, ADHESIVE COMPOSITIONS, AND METHODS FOR MAKING SAME

This application is a Division of U.S. Ser. No. 09/815,357, filed Mar. 23, 2001, now U.S. Pat. No. 6,548,615.

TECHNICAL FIELD

The invention relates to a process for making liquid melamine urea formaldehyde ("MUF") resins, liquid suspension hardeners, and adhesive compositions containing these materials. In particular, the invention relates to a liquid MUF resin that is stable for a significant period of time.

BACKGROUND OF THE INVENTION

MUF resins are widely used in the woodworking industry for gluing wood or as binders for the production of wood-based materials, including particle board, plywood, various fiber boards, and the like. These resins are the products of reactions of urea and melamine with formaldehyde. The resin is then set or cured with a hardener, such as ammonium salts or acids.

The resins, however, can often quickly solidify once the reaction between the melamine, urea, and formaldehyde is complete, sometimes in a matter of hours or minutes. This solidifying before the hardener is added, is problematic in that the resin cannot be stored for later use.

U.S. Pat. No. 4,536,245 to Shiau et al. discloses a MUF resin with a formaldehyde to urea equivalent molar ratio of 0.7:1 to 1.3:1. Urea equivalent is calculated by determining the moles of urea used and adding to that value 1.5 times the moles of melamine used. Thus, the urea equivalent molar ratio will be smaller than a straight formaldehyde to urea and melamine molar ratio.

U.S. Pat. No. 4,603,191 to Kong discloses a process for preparing a urea-formaldehyde resin having a very low mole ratio of formaldehyde to urea. It teaches a formaldehyde to urea molar ratio of 1:1 to 1.3:1.

U.S. Pat. No. 4,997,905 to Druet et al. teaches a process for producing a melamine urea-formaldehyde resin in three stages wherein the melamine is added at the first stage, second stage, or both. The final ratio of formaldehyde to amino groups ratio is 0.3:1 to 0.5:1.

U.S. Pat. No. 5,008,365 to Druet et al. teaches a process for producing a urea-formaldehyde resin with no more than 10% melamine. The final ratio of formaldehyde to amino groups is 0.5:1 to 0.575:1.

U.S. Pat. No. 5,162,462 to Barthomieux et al. teaches a process for producing aminoplast resins with 2-ureido-4,6-diaminotriazine-1,3,5 and optionally added melamine. The result is a resin with very low formaldehyde emission rates.

U.S. Pat. No. 5,681,917 to Breyer et al. discloses a method for preparing an MUF resin with a low formaldehyde content. The resin has a formaldehyde to urea and melamine molar ratio of 0.5:1 to 1.1:1.

E.P. Application No. 0501174 discloses a hardening composition for a urea-formaldehyde adhesive that includes an aqueous solution of an ammonium salt as a polymerization catalyst and a polyvinyl acetate resin in an emulsion.

PCT Application No. WO 99/48991 discloses a hardener for use in urea-formaldehyde and urea-melamine-formaldehyde based adhesives that includes a polyvinyl acetate emulsion together with a metal chloride and an ammonium salt.

A urea formaldehyde resin with a high melamine content is described by in "Melamine Modified Urea-formaldehyde Resin For Bonding Flakeboards," Proceedings of a Symposium on Wood Adhesives Before the *Forest Products Research Society*, pp. 155–59, Madison, Wis., 1990. The resins contained 9.5 to 34.4 percent melamine by weight. These resins, however, had a shelf life of less than 1 day.

The focus of the art up to this point has been to produce a resin that has very low formaldehyde emission rates. These resins either do not have good wet bonding strength or have insufficient stability to be stored for extended periods of time. Thus, there is a need for liquid resins that are stable for extended periods of time, can be stored for later use, and are resistant to moisture in wood bonding applications. Resins that contain a higher level of formaldehyde and melamine are generally less stable than those that contain less formaldehyde and melamine. There is also a need in the art for a liquid resin and liquid hardener that can be used in both thermal and radio frequency curing conditions.

SUMMARY OF THE INVENTION

The invention relates to a method of preparing a stable melamine urea formaldehyde resin, including the steps of: providing a first aqueous solution of formaldehyde, heating the solution, adding in a single step about 0.35 to 0.65 molar equivalents of urea based on the amount of formaldehyde provided in the first aqueous solution to form a UF mixture, adding acid to the UF mixture to adjust the pH to a value of about 4 to 7 to provide an acidified UF mixture, monitoring the viscosity of the acidified UF mixture until it reaches a value of about 150 to 1000 cps, adjusting the pH of the acidified mixture to a value of about 8 to 10 to provide a basic UF mixture, adding a second aqueous solution including about 0.24 to 1.27 molar equivalents of formaldehyde based on the amount of formaldehyde provided in the first aqueous solution to the basic UF mixture, adjusting the pH of the basic UF mixture to a value of about 8 to 10, adding in a single step about 0.15 to 0.55 molar equivalent of melamine based on the amount of formaldehyde provided in the first aqueous solution to the basic UF mixture to form an MUF mixture, monitoring the viscosity of the MUF mixture until it reaches a value of about 150 to 1000 cps, and adjusting the pH to a value of about 9 to 10 to provide the melamine urea formaldehyde resin having a viscosity that is less than about 1500 cps for about 14 days.

In one embodiment, the preparation further includes adding up to about 0.13 molar equivalents of methanol based on the amount of formaldehyde provided in the first aqueous solution to the MUF mixture. In a preferred embodiment, the added acid is formic acid. The pH may be adjusted with sodium hydroxide. In a preferred embodiment, the viscosity of the acidified UF mixture is monitored until the viscosity reaches a value of about 150 to 400 cps. The aqueous mixture of formaldehyde is preferably formalin.

In another embodiment, the method includes preparing a melamine urea formaldehyde resin and adding a hardener to the resin to form an adhesive. In one embodiment, the hardener or adhesive is combined with a filler selected from the group of wood flour, pecan shells, organically modified cellulose, various starches, insoluble fibrous carbohydrate fillers, tricalcium phosphate, clay, barium sulfate, and hydrated aluminum magnesium silicates.

The invention further relates to a MUF resin having a formaldehyde to melamine and urea molar ratio of about 1.5:1 to 2.5:1, a melamine to urea molar ratio of about 0.25:1 to 1.5:1, and a viscosity of less than about 1500 cps for about 14 days. In a preferred embodiment, the formaldehyde to melamine and urea molar ratio is about 1.75:1 to 2.3:1, the melamine to urea molar ratio is about 0.5:1 to 0.75:1, the viscosity is about 200 cps to 400 cps, and the viscosity of the resin remains at a value of less than about 1500 cps for at least about 3 weeks.

The invention also relates to a liquid hardener including a catalyst, a filler, a thickener, and water, wherein the filler remains suspended in the hardener for at least about 14 days. In a preferred embodiment, the hardener includes about 6% to 30% of the catalyst, about 7% to 50% of the filler, and about 0.8% to 10% of the thickener. The catalyst is selected from the group consisting of a Lewis acid, a Bronsted acid, an ammonium salt, a substituted ammonium salt, or a combination thereof. Preferably, the catalyst includes $AlCl_3$, $NH_4Cl$, or a combination thereof; the filler includes pecan shells, wood flour, or a combination thereof; and the thickener includes polyurethane, polyvinyl alcohol, fumed silica, or a bentone clay. In another embodiment, the liquid hardener further includes an anti-foaming agent.

The invention also relates to an adhesive composition including a hardener and an MUF resin, the resin having a formaldehyde to melamine and urea molar ratio of about 1.5:1 to 2.5:1, a melamine to urea molar ratio of about 0.24:1 to 1.27:1, wherein the viscosity of the adhesive is less than about 1500 cps for at least about 14 days. In one embodiment, the composition includes about 5 to 35 parts per hundred of the hardener. In a preferred embodiment, the composition has a conductivity of about 1 to 5 mS/cm.

DETAILED DESCRIPTION OF THE PREFERRED EMBODIMENTS

The invention relates to a liquid MUF resin that is stable for extended periods of time and to a process for making the resin. The resin is stable for at least 14 days, preferably at least 3 weeks, and more preferably at least 4 weeks. The resin contains a relatively higher amount of formaldehyde and melamine than is found in prior art resins. The higher level of formaldehyde unexpectedly gives the MUF resin of the invention desired physical properties not present in the prior art resins. These properties include a greater bonding strength and shorter reaction time to prepare the resin. Also, for wood bonding applications, a higher formaldehyde to melamine and urea ratio is desirable because a lower ratio increases the time required to cure the composition once the hardener is added. The final molar ratio of formaldehyde to melamine and urea in the MUF resin of the invention is typically about 2.0 to 1. This MUF resin is prepared according to the following steps:

(a) A first aqueous solution of formaldehyde, at a pH of about 7 to 10, preferably at a pH from about 8.0 to 8.5, is contacted with urea. The amount of formaldehyde is about 60% of the total formaldehyde to be used. Urea is added in an amount of about 0.35 to 0.65 molar equivalents relative to the amount of formaldehyde in the first aqueous solution of formaldehyde. Preferably, the aqueous formaldehyde solution is heated to about 40° C. to 60° C., and more preferably to about 45° C. to 55° C., before the urea is added. Once the urea is added, the mixture is heated to about 80° C. to 100° C., preferably about 85° C. to 95° C. The pH of the formaldehyde solution can be adjusted with caustic, such as an aqueous sodium hydroxide solution containing up to 50% sodium hydroxide;

(b) A sufficient amount of acid is added to the mixture to cause the urea and formaldehyde to polymerize. Typically enough acid is added to adjust the pH to a value of about 4 to 7, preferably to a value of about 4.9 to 5.1;

(c) The viscosity of the mixture is monitored using a Brookfield cone plate viscometer at 25° C. using spindle #42 and shear rate of 10 rpm for a 1 ml sample; when the viscosity reaches about 150 to 1000 cps, preferably about 200 to 800 cps, and more preferably about 250 to 450 cps, the mixture is cooled to about 50° C. to 70° C., preferably about 55° C. to 65° C., and the pH is adjusted to a value of about 8 to 10, preferably about 8.4 to 8.8. The pH can be adjusted with a caustic, such as an aqueous sodium hydroxide solution containing up to 50% sodium hydroxide;

(d) Additional aqueous formaldehyde, about 0.24 to 1.27 molar equivalents, preferably about 0.44 to 0.84 molar equivalents, relative to the amount of formaldehyde in the first aqueous solution of formaldehyde is added and the pH of the mixture is readjusted to a value of about 8 to 10, preferably about 8.5 to 8.8;

(e) Melamine is added in an amount of about 0.15 to 0.55 molar equivalents, preferably about 0.22 to 0.42 equivalents, relative to the amount of formaldehyde in the first aqueous solution of formaldehyde, followed by a sufficient amount of methanol, typically up to 0.13 molar equivalents relative to the amount of formaldehyde in the first aqueous solution of formaldehyde, to prevent polymerization of methylol groups that are formed from the reaction of formaldehyde with the melamine or urea, and the pH is then increased to a value sufficient to cause the melamine to react with the formaldehyde. Typically the pH is increased to about 9 to 11, preferably to about 9.6 to 10.5. The reaction is typically heated to about 70° C. to 90° C., preferably about 75° C. to 85° C.;

(f) The viscosity of the mixture is monitored until it reaches a value of about 150 to 1000 cps, preferably about 200 to 400 cps, and the reaction is then cooled to about 15° C. to 35° C., preferably about 20° C. to 30° C., and the pH is adjusted to a value of about 9 to 10, preferably about 9.2 to 9.5, to finish the reaction.

The melamine and urea are each added in single steps, making the process simpler than the processes used in the prior art. The pH can be adjusted using any suitable caustic or acid. Preferably, the caustic is an aqueous sodium hydroxide solution containing up to 25% sodium hydroxide, or tri-ethanol amine. Preferably, the acid is 10% formic, 5% nitric, or 5% sulfuric acid. The amount of time required for each step varies, depending on the temperature and pH at which the step is carried out. One of ordinary skill in the art can readily determine the reaction time without undue experimentation. Preferably, the aqueous mixture of formaldehyde is a solution of 44% formaldehyde (formalin). Other formaldehyde solutions may also be used, such as a 50% or 37% aqueous solution, or even a urea-formaldehyde concentrate. When the formaldehyde content is more than 40%, the solution may require heating in order to maintain a solution. The amount of each reagent can be varied depending on the amount of MUF resin to be produced, but the molar ratio of the reagents should remain the same.

The formaldehyde reacts with both the urea and the melamine to form a methylol group, —$CH_2OH$. The addition of the methanol esterifies the methylol group to provide a stable resin. Preferably, less than about 2% of the methylol groups are esterified. Alternatively, the urea and formaldehyde can be reacted separately and the melamine and formaldehyde reacted separately and the resulting mixtures then combined together.

The invention also relates to the resulting MUF resin. The MUF resin of the invention has a viscosity of about 150 cps to 1000 cps, preferably from about 200 to 400 cps and is stable for at least about 14 days, preferably at least about 3 weeks, more preferably at least about 4 weeks. The term "stable" or "stability" as used herein means that the length of time at a temperature of about 25° C. before the viscosity of the resin reaches 1500 cps, preferably before it reaches 1000 cps. The MUF resin is still useful, however, at viscosities up to about 2000 cps. The resin typically has a solid content of about 40% to 80%, preferably about 50% to 70%.

The MUF resins typically have a molar ratio of melamine to urea of about 0.25:1 to 1.5:1, preferably about 0.45:1 to 0.8:1, and more preferably about 0.5:1 to 0.75:1. In one example, the melamine to urea ratio was about 0.64 to 1. The resin typically has a formaldehyde to melamine and urea ratio of about 1.5:1 to 2.5:1, preferably about 1.75:1 to 2.3:1. In one example, the formaldehyde to melamine and urea ratio was about 2.0 to 1. The resin is advantageously more water resistant than conventional resins, due to its high melamine content. The resins also have a higher formaldehyde content than the prior art which is believed to make the resins stronger and more reactive.

The invention further relates to a hardener that can be mixed with the resin to form a adhesive composition for use in wood bonding. The hardener includes a catalyst, a thickener, a filler, and water. The hardener includes about 6% to 30%, preferably about 7% to 17% of a catalyst; about 7% to 50%, preferably about 8.5% to 45% of a filler; and about 0.8% to 10% of a thickener; with the remainder of the composition made up of water.

The catalyst is used to catalyze the curing of the adhesive during wood bonding applications. Without wishing to be bound by theory, it is believed that this is accomplished by cross-linking of the resin during curing. The catalyst may be a Lewis acid or a Bronsted acid and may be an organic or inorganic acid. The catalyst may also be an ammonium salt, such as, for example, $NH_4Cl$, or a substituted ammonium salt. As used herein, the term "substituted ammonium salt" refers to an acid addition salt of any aliphatic or aromatic amine.

Examples of Lewis acid catalysts include, but are not limited to, $AlCl_3$, $AlBr_3$, $Al_2(SO_4)_3$, $MgCl_2$, $MgBr_2$, along with other Lewis acids, in particular Lewis acids of Ca, Sr, Ti, Fe, Zn, Sn, Sb, Zr, Hg, Tl, Pb, Bi. Bronsted acid catalysts include, but are not limited to, HCl, $H_2SO_4$, $HNO_3$, $H_3PO_4$, $HClO_4$. Preferably the catalyst is $AlCl_3$, $NH_4Cl$, or a mixture thereof. For example, a 28% aqueous solution of $AlCl_3$ can be used. Other examples of hardener compositions are given in the examples below. One of ordinary skill in the art will be able to readily identify hardeners that could be used with the MUF resin of the invention.

The hardener includes a thickener or a thickening material. The thickening material can be anything that increases the viscosity of the hardener. The viscosity must be high enough to avoid separation of the suspended material, i.e., the filler, for at least two weeks, preferably at least four weeks. Typically, the thickener increases the viscosity of the hardener to greater than about 3000 cps, preferably greater than about 10,000 cps, and more preferably greater than about 20,000 cps. Any thickener known to those of ordinary skill in the art can be used. Examples of thickening materials include, but are not limited to, SER-AD FX 1100 (commercially available from Condea Servo LLC of New Jersey), a polyurethane thickener; a polyvinyl alcohol; a fumed silica; a bentone clay; and mixtures thereof. Preferably, the thickening agent is a polyurethane thickener.

Optionally, the thickening agent may also be added to the resin. Typically, when a polyurethane thickener is used, the thickener will be about 0.8% to 2.5% of the hardener. When a polyvinyl alcohol or acetate thickener is used, the thicker will be about 8% to 10% of the hardener.

The hardener also includes one or more fillers that are insoluble in water. The fillers help to fill the gaps between wood components when they are bonded together. It is very important that the filler material be present to sufficiently fill in the gaps. The filler material is suspended in the liquid portion of the hardener. Any filler known to those of ordinary skill in the art could be used, such as organic fillers including, but not limited to, wood flour, pecan shells, and other cellulosic materials including, but not limited to, organically modified cellulose, various starches, and insoluble fibrous carbohydrate fillers. Inorganic fillers that may be used include, but are not limited to, kaolin, tricalcium phosphate, clays, and barium sulfate. Other inorganic fillers include hydrated aluminum magnesium silicates, and others known in the art. Preferably, the inorganic filler is Attagel 40, a hydrated aluminum magnesium silicate (commercially available from Engelhard Co. of New Jersey). In one embodiment the wood flour may be present in an amount of about 7% to 10% by weight, and the pecan shells are present in an amount of about 2% to 8% by weight of the hardener. The resulting hardeners are stable and do not separate or precipitate, for at least two weeks, preferably for at least four weeks.

The hardener may also optionally contain anti-foaming agents. An anti-foaming agent prevents excess foaming and frothing when the ingredients of the hardener are mixed together. Examples of anti-foaming agents include, but are not limited to, silicones fluorocarbons, and other surface active agents.

Commercially available hardeners can also be used with the resin, such as for example, Cycat® HF475, an $NH_4Cl$ catalyzed powder type hardener (commercially available from Cytec Industries, Inc. of Stamford Conn.), or other similar commercially available hardeners.

The liquid MUF resin prepared by the process of the invention can be combined with a liquid hardener to form the adhesive. Any hardener known to those of ordinary skill in the art can be used. Preferably, the hardener is the hardener of the invention. The resins will cure when mixed with the hardener in wood bonding applications. The adhesive can be used to join two or more pieces of wood together and when the adhesive cures the pieces of wood become bonded together. The resins of the present invention generally cure in about three hours with 10% hardener at room temperature. The curing time is reduced with the addition of more hardener. For wood bonding applications, the higher formaldehyde to melamine ratio in the MUF resin of the present invention advantageously increases the cure speed for a given level of hardener, and, thus, reduces the necessary curing time. Typically, the adhesive contains about 5 to 35 parts per hundred (pph) of hardener, with the balance being the resin. Preferably, the adhesive contains about 10 to 20 pph of hardener.

Rather than a room temperature cure, two methods of curing are generally used. The first is radio frequency curing. A laboratory size 4 KW SL3648 Slant Adhesiver (commercially available from Radio Frequency Services, Inc. of Wilkesboro, N.C.) may be used for this type of curing. The curing time is generally about 90 seconds or less for the compositions of the present invention. The ionic compounds used as catalysts for the hardener make the adhesive conductive. The conductivity of the adhesive provides for heat generation under radio frequency conditions that leads to curing. The hardeners have the largest influence on the conductivity of the adhesives. A hardener with an $AlCl_3$ catalyst will generally have a lower conductivity, while a hardener with a $NH_4Cl$ catalyst will generally have a higher conductivity, when the same amounts of catalyst are used. A lower conductivity generates less heat under radio frequency conditions. If the temperature of the adhesive line is too low, the adhesive cure may be incomplete, thereby generating a weaker bond. Typically, the conductivity of the adhesive is about 1 to 5 mS/cm, preferably about 2 to 4 mS/cm.

The conductivity may be measured using any method known to those of ordinary skill in the art. For the examples below, the conductivity was measured using a 53 Electrodeless Conductivity Analyzer (commercially available from GLI International of Milwaukee, Wis.). The adhesive is placed in a beaker or similar container, and the probe of the analyzer is submersed therein. The analyzer measures the disturbance of the electric flux emitted by the probe.

A second method of curing is thermal press curing. A Carver Lab Press (commercially available from Fred S. Carver, Inc. of Summit, N.J.) may be used for this type of curing. The composition is pressed for about 4 to 5 minutes at a pressure of about 5,000 pounds and a temperature of at least about 120° C., preferably at least about 148° C.

These adhesives perform satisfactorily in wood bonding applications. Surprisingly, the liquid MUF resin-liquid hardener system of the present invention has excellent adhesive properties. As shown in the examples below, the wet shear performance is especially good. Liquid systems generally do not have good adhesive properties. The adhesive line, i.e., the line connecting two pieces of adhesived wood, is stronger compared to prior art adhesives, especially when it is exposed to wet environments than other adhesives.

Another advantage of this invention is that the resin and the hardener are generally both in liquid form. The prior art has generally used a powdered resin and powdered hardener. Powder materials, however, have the disadvantage of causing dust that is unwanted and can be environmentally harmful. Thus, having both the resin and hardener in liquid form is more convenient, more hygienic, and reduces labor costs. The labor costs are reduced because less mixing is required and the cure time is reduced.

The resins of the invention also has a shorter cure time than conventional resins and harden faster than prior art resins when the same hardeners are used.

EXAMPLES

The invention is further defined by reference to the following examples describing in detail the preparation of the MUF resins and adhesives of the invention. The invention described and claimed herein is not limited in scope by the specific embodiments herein disclosed, since these embodiments are intended as illustrations of several aspects of the invention. Indeed, various modifications of the invention in addition to these shown and described herein will become apparent to those skilled in the art from the foregoing description. Such modifications are also intended to fall within the scope of the invention.

Example 1

Liquid MUF Resin Preparation

A resin according to the invention was prepared by adding 955 grams of formalin at a concentration of 44% to a reaction vessel. The pH was adjusted to 8.0 to 8.5 using about 1.1 grams of 20% sodium hydroxide. The contents of the reaction vessel were heated to 50° C. and, after about 20 minutes, 423 grams of urea was added. The temperature was raised to 90° C. and held for 15 minutes. The reaction was then cooled to 85° C. and the pH reduced to 4.9 to 5.1 using about 1.1 grams of 10% formic acid. The viscosity was then monitored using a Brookfield cone plate viscometer at 25° C. using spindle #42 and shear rate 10 rpm with 1 ml samples. Once the viscosity reached 200 to 280 cps, the kettle was cooled to 60° C. and the pH increased to 8.4 to 8.8 with about 0.75 grams of 20% sodium hydroxide. A second formalin batch (610 grams of formaldehyde) was added to the mixture and the pH was readjusted to 8.5 to 8.8 with about 1.1 grams of 20% sodium hydroxide. Melamine, 567 grams, was then added, followed by 60 grams of methanol. The pH was then increased to 9.8 to 10.2 with about 1.1 grams of 20% sodium hydroxide. The mixture was then heated to 85° C. and the 25° C. hydrophobe test was conducted. The hydrophobe test is performed by removing a 25 gram sample of resin from the mixture and titrating the resin sample with distilled water at 25° C. to a hydrophobe (cloudy) endpoint. The volume of the distilled water is measured and the test repeated until the range is 22 to 25 ml/25 grams of resin. The hydrophobe test provides an indication that the desired viscosity has almost been reached. Once the hydrophobe end point was reached, the viscosity of the mixture was monitored until it reached a value of 200 to 280 cps. The mixture was then cooled to 25° C., the pH adjusted to 9.2 to 9.5 with about 0.35 grams of 20% sodium hydroxide and the resin filtered.

Example 2

Preparation of Liquid MUF Resins

Several resins were prepared following a procedure similar to that described in Example 1. Table 1 shows the composition and preparation parameters of the MUF resins prepared according to the procedure of Example 1.

TABLE 1

Liquid MUF Resin Synthesis

| Sample | R-1 | R-2 | R-3 | R-4 | R-5 | R-6 |
|---|---|---|---|---|---|---|
| F/U molar ratio | 2.1:1 | 2.1:1 | 2.1:1 | 2.1:1 | 2.1:1 | 2.1:1 |
| F/M molar ratio | 2.1:1 | 2.1:1 | 2.1:1 | 2.1:1 | 2.1:1 | 2.1:1 |
| U/M molar ratio | 1:1 | 61:39 | 61:39 | 61:39 | 61:39 | 61:39 |
| Urea addition temp. (° C.) | 45 | 45 | 70 | 70 | 70 | 70 |
| UF resinification pH | 5.0 | 5.2 | 5.0 | 5.0 | 5.2 | 5.2 |
| UF reaction temp. (° C.) | 85 | 85 | 90 | 85–90 | 85 | 85 |
| MUF reaction temp. (° C.) | 85 | 85 | 85 | 85 | 85 | 85 |
| Viscosity of final MUF resin (cps) | 150 | 140 | 200 | 980 | 250 | 385 |

Table 2 shows the properties of the sample MUF resins prepared according the procedures of Example 1.

TABLE 2

MUF Resin Characteristics

| Sample | R-1 | R-2 | R-3 | R-4 | R-6 |
|---|---|---|---|---|---|
| Free Formaldehyde % | 0.76 | 0.82 | 0.78 | 0.51 | 0.6 |
| —CH$_2$OH % | | | | 8.35 | 12.5 |
| Pan Solids %* | 59.7 | 58.5 | 59.6 | | 59.0 |
| Nitrogen % | 23.3 | 21.6 | 25.9 | 22.3 | |
| Total Formaldehyde % | 25.3 | 25.9 | 26.8 | 27.2 | |

*heat 2 grams of resin in an oven at 105° C. oven for 2 hours; divide the weight of the remaining amount by 2 grams to obtain the volume for pan solids %

Table 3 shows the viscosity development of liquid MUF resins prepared according to the procedure of Example 1.

TABLE 3

Stability/Viscosity of Liquid MUF Resin According to Example 1

| Sample | R-1 | R-2 | R-3 | R-4 | R-5 | R-6 |
|---|---|---|---|---|---|---|
| Initial Viscosity (cps) | 150 | 140 | 200 | 980 | 250 | 385 |
| Viscosity (cps)- after x days of storage at 25° C. | 184 (9 days) 200 (14 days) 212 (20 days) | 152 (6 days) 180 (16 days) | 220 (5 days) 236 (11 days) 380 (27 days) | 1132 (6 days) | 220 (4 days) | 336 (5 days) |
| Viscosity (cps)- after x days of storage at 35° C. | 308 (12 days) 1840 (21 days) | 384 (10 days) 2976 (19 days) | 200 (3 days) 380 (12 days) 1480 (27 days) | 2160 (7 days) | 324 (5 days) | 492 (5 days) |

The Example shows that the resins of the invention have good stability as measured by viscosity. The results show that the viscosity of the resin does not change significantly at 25° C. over extended periods of time.

Example 3

Aluminum Chloride Based Liquid Suspension Hardener 167.7 grams of water was combined in a flask with about 4.95 grams of Attagel 40 with agitation, and the mixture stirred for 15 minutes. About 25.9 grams of $AlCl_3 \cdot 6H_2O$ crystals was then added and the mixture further stirred an additional 15 minutes. Next, about 23 grams of kaolin (an aluminum silica clay commercially available from Engelhard Co. of New Jersey) was added and the mixture stirred another 15 minutes followed by adding about 3.9 grams of Ser-AD-FX 1100 to thicken the mixture and the mixture was stirred at 35° C. to 40° C. for about 4 hours, until the thickener was no longer visible on the surface of the hardener mixture. About 27.5 grams of pecan shells was added and the mixture was stirred for an additional 15 to 20 minutes to obtain a uniform viscous liquid product.

Example 4

Preparations of Liquid Suspension Hardeners

Table 4 shows the composition of three different liquid hardener compositions that were used in the present invention. All amounts are in grams.

TABLE 4

Hardener Compositions

| | H-I | H-2 | H-3 |
|---|---|---|---|
| Water | 163.1 | 111.7 | 143.56 |
| Attagel | 8.63 | 10.91 | 4.85 |
| $AlCl_3 \cdot 6H_2O$ | 0 | 0 | 49.88 |
| 28% $AlCl_3$ aqueous solution | 181 | 124 | 0 |
| $NH_4Cl$ prills[1] | 39.4 | 45 | 0 |
| Kaolin clay | 55.2 | 37.8 | 41.71 |
| Ser-AD FXL1100 | 6.2 (1.2%) | 4.4 (1.17%) | 2.425 |

TABLE 4-continued

Hardener Compositions

| | H-I | H-2 | H-3 |
|---|---|---|---|
| Pecan shells[2] | 19 | 13 | 0 |
| Wood Flour 140[3] | 43.2 | 29.6 | 24.25 |
| Total Weight | 515.73 | 376.4 | 266.75 |

[1]$NH_4Cl$ prills are commercially available from Van Waters & Rogers of Salem, MA.
[2]Pecan shells are commercially available from South Georgia Co. of Valdosta, GA.
[3]Wood flour is commercially available from American Wood Flour Co. of Schofield, WI.

Example 5

Adhesive Preparation and Application

Several adhesives were prepared using the resin prepared in Example 1 and various hardeners.

Table 5 shows the composition and characteristics of the thermally cured liquid MUF resin based adhesives. All samples contained 100 grams of liquid MUF resin. Table 5 provides the characteristics of the adhesives and the shear strength (both wet and dry) for wood bonded under thermal conditions. Sample G-2 contains a commercially available solid powder hardener. Sample G-4 contains the hardener prepared in Example 3. Samples G-1 and G-3 contain $AlCl_3$ hardeners of the invention, prepared according to the following procedure:

60.3 grams of water was added in a flask with agitation followed by about 2.0 grams of Attagel 40 and the mixture stirred for 15 minutes. About 18.7 grams of $AlCl_3 \cdot 6H_2O$ crystals were then added and the mixture further stirred an additional 15 minutes. Next, about 17.2 grams of kaolin were added and the mixture stirred another 15 minutes. About 1.8 grams of Ser-AD-FX 1100 were then added to thicken the mixture. The mixture was stirred at 35° C. to 40° C. for about 4 hours, until the thickener was no longer visible from the surface of the hardener mixture, to obtain a uniform viscous liquid product.

TABLE 5

Thermally Cured Liquid MUF Resin Based Adhesives

| Sample | G-1 | G-2 | G-3 | G-4 |
|---|---|---|---|---|
| AlCl$_3$ hardener (g) | 10 | 0 | 10 | 20 |
| Wood Flour (g) | 0 | 0 | 3 | 0 |
| HF475* (g) | 0 | 6 | 0 | 0 |
| Initial Viscosity (cps) | 1608.00 | 800 | 1720 | 1356 |
| Pot Life (hrs) | 2.83 | >3.5 | 2.1 | 2.4 |
| Gel time (min) | 1.5 | 2 | 1.4 | — |
| Dry Shear (psi) | 2017 | 2429 | 2657 | 2479 |
| WetShear (psi) | 639 | 1375 | 1666 | 1186 |

*HF475 is a solid powder hardener commercially available from Cytec Industries, Inc. of Stamford, CT.

Table 6 shows characteristics of Radio frequency cured liquid MUF resin based adhesives prepared using the resin of Example 1 and the shear strength (both wet and dry) for wood bonded under radio frequency conditions. All samples contained 100 grams of liquid MUF resin and 10 grams of the AlCl$_3$ hardener as prepared above.

TABLE 6

Radio Frequency Cured Liquid MUF Resin Based Adhesives

| Sample | G-5 | G-6 |
|---|---|---|
| Wood Flour (g) | 7.5 | 0 |
| HF475 (g) | 0 | 3.7 |
| Dry Shear (psi) | 2794 | 2520 |
| Wet Shear (psi) | 740 | 927 |

The initial viscosity of the adhesive composition is its viscosity immediately after it is produced. The pot life of the adhesive is measured by mixing the resin and the hardener in a jar at a temperature of less than 25° C. and then placing the jar in a 25° C. bath while occasionally stirring. The jar is a cup about 3 inches in diameter and about 4 inches tall and is about ⅔ filled with adhesive. The pot life is the time at which the hardener and resin form a semi-solid with jelly-like consistency and is considered to be the time until no adhesive will flow from the cup when inverted for about 10 to 15 seconds.

Gel time is determined by transferring 1 mL of the adhesive mixture to a 10 mL test tube immediately after the adhesive is prepared. The test tube is immersed in 80° C. oil bath and a coffee stick that is about 24 cm long and about 0.4 cm wide is immersed in the mixture. The coffee stick is stirred through the mixture. The gel time is the time when the adhesive is solidified and the stick can no longer be removed from the mixture.

The shear strength test for wood adhesive line bonds was determined following ASTM D-905, "Standard Test Method for Strength Properties of Adhesive Bonds in Shear by Compression Loading." The following are a descriptions of the testing done for a wood strip shear test.

Adhesive is applied to the surface area of wood sticks having a size of about 11 to 12 inches by 1.3 to 1.6 inches by about 1 inch. Six wood sticks are lined up and edge adhesived together in a radio frequency oven. The resulting panel is planed on both sides to remove about 1 to 2 mm from each side. The panel is then cut perpendicular to the adhesive lines into strips about 2 inches wide. Each strip has about 5 adhesive lines and the adhesive section on each adhesive line has an area of about 2 inches by 1.3 to 1.6 inches.

A wood panel can also be prepared with a hot press. Adhesive is applied to the wood surface area of wood sticks having a size of about 6 inches by 1⅛ inches by ⅜ inches. The faces of two wood sticks are adhesived together and cured with a hot press to give single wood panel. The specimen is then cut according to the description in ASTM D-905.

Dry shear strength testing is then carried out on these wood strips according to the procedure described in ASTM D-905. For wet shear strength testing, the wood is further treated by soaking in water for 48 hours, drying the wood for 8 hours at 140° F., soaking in water for an additional 16 hours, drying again for 8 hours at 140° F., and finally soaking in water again for 16 hours. The test is then performed while the wood is still wet.

The Example shows that the MUF resins of the invention can be used to make adhesives that have dry and wet shear strengths similar or superior to that of conventional adhesives.

Example 6

Adhesive Preparation and Application

Several different hardeners were added to the resin prepared according to Example 1. The shear strength of the adhesive, both wet and dry, was then evaluated following the procedure of ASTM D-905.

Table 7 shows a shear test comparison for adhesive compositions using the hardeners shown in Table 4 and the resin of Example 1 with that of a commercially available adhesive. The hardeners, H-1 to H-3, were combined with the resin of Example 1. The shear strength was compared to a adhesive prepared from a commercially available powder resin, Melurac 450 (commercially available from Cytec Industries of Stamford, Conn.), combined with a powder hardener, N.C. HF (commercially available from National Casein of New Jersey), mixed in 130 grams of added water. The wood used was planed oak and the adhesives were cured under radio frequency conditions. In all cases, 200 grams of resin were combined with 20 grams of hardener.

TABLE 7

Shear Test Strength Comparison

| Hardener | Resin of Example 1 and H-1 | Resin of Example 1 and H-2 | Resin of Example 1 and H-3 | Melurac 450 and N.C. HF |
|---|---|---|---|---|
| Viscosity (cps) | 1820 | 1462 | 1656 | 1196 |
| Gel Time (hrs) | >1.75 | 1.42 | | |
| Conductivity (mS/cm) | 3.0 | 4.2 | 1.5 | 2.2 |
| pH | 4.42 | 4.87 | 4.46 | 6.52 |
| Adhesive line temp. (° C.) | 170–181 | 180–204 | 130–142 | 160–178 |
| Wet shear (psi) | 1482 | 1209 | 1257 | 1409 |

Table 7 shows that the adhesives of the present invention have shear strengths that meet or exceed the shear strengths of prior art adhesives using solid resins and solid hardeners. The present invention has an advantage over these solid resin-solid hardener adhesives in that the liquid resin and liquid hardener avoid dust in the environment and therefore are safer.

What is claimed is:

1. A method of preparing a stable melamine urea formaldehyde resin, comprising:
   providing a first aqueous solution of formaldehyde;
   adding in a single step about 0.35 to 0.65 molar equivalents of urea based on the amount of formaldehyde provided in the first aqueous solution to form a UF mixture;

adding acid to the UF mixture to adjust the pH to a value of about 4 to 7 to provide an acidified UF mixture;

monitoring the viscosity of the acidified UF mixture until it reaches a value of about 150 cps to 1000 cps;

adjusting the pH of the acidified UF mixture to a value of about 8 to 10 to provide a basic UF mixture;

adding a second aqueous solution comprising about 0.24 to 1.27 molar equivalents of formaldehyde based on the amount of formaldehyde provided in the first aqueous solution to the basic UF mixture;

adjusting the pH of the basic UF mixture to a value of about 8 to 10;

adding in a single step about 0.15 to 0.55 molar equivalents of melamine based on the amount of formaldehyde provided in the first aqueous solution to the basic UF mixture to form an MUF mixture;

monitoring the viscosity of the MUF mixture until it reaches a value of about 150 to 1000 cps.

2. The method of claim 1, further comprising adding up to about 0.13 molar equivalent of methanol based on the amount of formaldehyde provided in the first aqueous solution to the MUF mixture.

3. The method of claim 1, wherein the acid is formic acid, nitric acid or sulfuric acid.

4. The method of claim 1, wherein the pH is adjusted with aqueous sodium hydroxide or tri-ethanol amine.

5. The method of claim 1, wherein the viscosity of the acidified UF mixture is monitored until the viscosity reaches a value of about 250 cps to 450 cps.

6. The method of claim 1, wherein the aqueous mixture of formaldehyde is formalin.

7. The method of claim 1, wherein said melamine urea formaldehyde resin has a viscosity less than about 1500 cps for at least about 14 days.

8. The method of claim 1, wherein said first aqueous solution of formaldehyde is heated.

9. The method of claim 1, wherein the temperature of said MUF mixture is adjusted to about 15° C to 35° C and the pH is adjusted to a value of about 9 to 10 after the viscosity of said MUF mixture reaches a value of about 150 to 1000 cps.

10. An adhesive composition comprising the melamine urea formaldehyde resin prepared by the method of claim 1.

11. The adhesive composition of claim 10 further comprising a hardener.

12. The adhesive composition of claim 11, wherein said hardener comprises a catalyst, a filler, a thickener, and water.

13. The adhesive composition of claim 12, wherein said catalyst is selected from the group consisting of a Lewis Acid, a Bronsted acid, an ammonium salt, a substituted ammonium salt or a combination thereof.

14. The adhesive composition of claim 12, wherein said thickener comprises polyurethane, polyvinyl alcohol, fumed silica or a bentone clay.

15. The adhesive composition of claim 12, wherein said filler is selected from a group consisting of wood flour, pecan shells, organically modified cellulose, various starches, insoluble fibrous carbohydrate fillers, tricalcium phosphate, clay, barium sulfate, and hydrated aluminum magnesium silicates.

* * * * *